US012397292B2

(12) United States Patent
Hu et al.

(10) Patent No.: US 12,397,292 B2
(45) Date of Patent: Aug. 26, 2025

(54) DETECTION CHIP, METHOD FOR USING DETECTION CHIP, AND DETECTION DEVICE

(71) Applicants: BEIJING BOE HEALTH TECHNOLOGY CO., LTD., Beijing (CN); BOE TECHNOLOGY GROUP CO., LTD., Beijing (CN)

(72) Inventors: Lijiao Hu, Beijing (CN); Haochen Cui, Beijing (CN); Chungen Yuan, Beijing (CN); Tao Hu, Beijing (CN); Jing Li, Beijing (CN); Weiqiong Gan, Beijing (CN); Xiaohe Shen, Beijing (CN)

(73) Assignees: BEIJING BOE HEALTH TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 712 days.

(21) Appl. No.: 17/622,277

(22) PCT Filed: Feb. 1, 2021

(86) PCT No.: PCT/CN2021/074635
§ 371 (c)(1),
(2) Date: Dec. 23, 2021

(87) PCT Pub. No.: WO2021/164530
PCT Pub. Date: Aug. 26, 2021

(65) Prior Publication Data
US 2022/0250067 A1 Aug. 11, 2022

(30) Foreign Application Priority Data
Feb. 20, 2020 (CN) ......................... 202010104016.2

(51) Int. Cl.
*B01L 3/00* (2006.01)

(52) U.S. Cl.
CPC ... *B01L 3/502738* (2013.01); *B01L 3/502753* (2013.01); *B01L 3/567* (2013.01);
(Continued)

(58) Field of Classification Search
CPC ......... B01L 3/502738; B01L 3/502753; B01L 3/567; B01L 2200/0652; B01L 2200/0689;
(Continued)

(56) References Cited

U.S. PATENT DOCUMENTS

2005/0266582 A1* 12/2005 Modlin .................. G01N 21/77 436/164
2010/0291588 A1* 11/2010 McDevitt ............. G01N 33/491 435/287.1
2011/0162785 A1 7/2011 Zhou et al.
2012/0178091 A1* 7/2012 Glezer .................. B01L 3/5027 435/6.12
(Continued)

FOREIGN PATENT DOCUMENTS

CN 105349401 A 2/2016
CN 205127987 U 4/2016
(Continued)

*Primary Examiner* — Jennifer Wecker
*Assistant Examiner* — Britney N. Washington
(74) *Attorney, Agent, or Firm* — Chiwin Law LLC

(57) ABSTRACT

A detection chip, a method for using a dejection chip, and a detection device are provided. The detection chip includes a chip substrate and a first sealing film that are stacked. The chip substrate includes a first surface, and the first sealing film covers the first surface of the chip substrate. The chip substrate further includes a fluid channel on the first surface, and the fluid channel includes a plurality of membrane valve portions. The membrane valve portions are configured to allow a portion of fee first sealing film covering the membrane valve portions to approach and separate, so as to close and open the fluid channel correspondingly.

9 Claims, 6 Drawing Sheets

(52) U.S. Cl.
CPC .................. *B01L 2200/0652* (2013.01); *B01L 2200/0689* (2013.01); *B01L 2200/10* (2013.01); *B01L 2300/049* (2013.01); *B01L 2300/0816* (2013.01); *B01L 2300/123* (2013.01); *B01L 2400/0638* (2013.01)

(58) Field of Classification Search
CPC ........... B01L 2200/10; B01L 2300/049; B01L 2300/0816; B01L 2300/123; B01L 2400/0638; B01L 2200/0668; B01L 2300/0887; B01L 2400/043; B01L 2400/0481; B01L 2400/0655; B01L 3/50273; B01L 2300/0819; B01L 2400/0487
See application file for complete search history.

(56) References Cited

U.S. PATENT DOCUMENTS

| | | | | |
|---|---|---|---|---|
| 2015/0093838 | A1 | 4/2015 | Landers et al. | |
| 2016/0186240 | A1* | 6/2016 | Andreyev ............. | B01L 3/5029<br>435/287.2 |
| 2018/0093269 | A1* | 4/2018 | Rachamim ........ | B01L 3/502738 |
| 2022/0032291 | A1 | 2/2022 | Wu | |

FOREIGN PATENT DOCUMENTS

| | | | |
|---|---|---|---|
| CN | 101750488 | A | 6/2016 |
| CN | 101750489 | A | 6/2016 |
| CN | 108816300 | A | 11/2018 |

* cited by examiner

DETECTION CHIP, METHOD FOR USING DETECTION CHIP, AND DETECTION DEVICE

This application is a U.S. National Phase Entry of International Application No. PCT/CN2021/074635 filed on Feb. 1, 2021, designating the United States of America and claiming priority to Chinese Patent Application No. 202010104016.2, filed on Feb. 20, 2020. The present application claims priority to and the benefit of the above-identified applications and the above-identified applications are incorporated by reference herein in their entirety.

TECHNICAL FIELD

Embodiments of the present disclosure relate to a detection chip, a method for using a detection chip, and a detection device.

BACKGROUND

Microfluidic chip technology integrates basic operation units such as sample preparation, reaction, separation and detection involved in the fields of biology, chemistry, medicine, or the like, into a chip with a micrometer-scale micro channel, so as to automatically complete the whole process of reaction and analysis. The chip used in this process is referred to as a microfluidic chip, and may also be referred to as lab-on-a-chip. Microfluidic chip technology has the advantages of small sample consumption, fast analysis speed, easy to be made into portable instruments, suitable for instant and on-site analysis, or the like, and has been widely used in various fields such as biology, chemistry, medicine, and the like.

SUMMARY

At least one embodiment of the present disclosure provides a detection chip, which comprises a chip substrate and a first sealing film that are stacked. The chip substrate comprises a first surface, and the first sealing film covers the first surface of the chip substrate; the chip substrate further comprises a fluid channel on the first surface, and the fluid channel comprises a plurality of membrane valve portions; and the membrane valve portions are configured to allow a portion of the first sealing film covering the membrane valve portions to approach and separate, so as to close and open the fluid channel correspondingly.

For example, the detection chip provided by an embodiment of the present disclosure further comprises a membrane valve sealing plate. The membrane valve sealing plate is on a side of the first sealing film away from the chip substrate and comprises a plurality of protruding structures, the plurality of protruding structures and the plurality of membrane valve portions are in one-to-one correspondence, and in the case where the plurality of protruding structures are in contact with the plurality of membrane valve portions, respectively, the fluid channel is closed.

For example, in the detection chip provided by an embodiment of the present disclosure, the first sealing film is an elastic film.

For example, in the detection chip provided by an embodiment of the present disclosure, the chip substrate further comprises at least one liquid cell, the at least one liquid cell is communicated with the fluid channel, and at least one of the plurality of membrane valve portions is configured to close and open a portion of the fluid channel communicated with the at least one liquid cell.

For example, in the detection chip provided by an embodiment of the present disclosure, the fluid channel further comprises an extraction region and a plurality of first branches, and the at least one liquid cell comprises a plurality of liquid cells; the plurality of first branches are communicated with the plurality of liquid cells in one-to-one correspondence, and each of the plurality of first branches is communicated with the extraction region; and the plurality of membrane valve portions comprise a plurality of first membrane valve portions respectively on the plurality of first branches, so as to control the plurality of first branches to be opened or closed.

For example, in the detection chip provided by an embodiment of the present disclosure, the fluid channel further comprises a reaction region and a plurality of second branches; the reaction region is communicated with the extraction region and at least one of the plurality of liquid cells through the plurality of second branches, respectively; and the plurality of membrane valve portions further comprise a plurality of second membrane valve portions respectively on the plurality of second branches, so as to control the plurality of second branches to be opened or closed.

For example, in the detection chip provided by an embodiment of the present disclosure, the reaction region comprises a porous structure, the porous structure comprises a plurality of liquid containing holes, and the plurality of liquid containing holes are configured to contain identical or different amplification primers.

For example, in the detection chip provided by an embodiment of the present disclosure, the plurality of liquid cells comprise a first liquid cell, a second liquid cell, a third liquid cell, a fourth liquid cell, and a fifth liquid cell, the first liquid cell is configured to contain a lysis solution, the second liquid cell is configured to contain a first rinsing solution, the third liquid cell is configured to contain a second rinsing solution, the fourth liquid cell is configured to contain an eluent, and the fifth liquid cell is configured to accommodate a waste liquid generated in the extraction region during a reaction process.

For example, the detection chip provided by an embodiment of the present disclosure further comprises a second sealing film. The chip substrate comprises a second surface opposite to the first surface, and the second sealing film covers the second surface of the chip substrate.

For example, in the detection chip provided by an embodiment of the present disclosure, the second sealing film is a composite film comprising metal foil and a polymer material that are stacked.

For example, the detection chip provided by an embodiment of the present disclosure further comprises an adhesive layer. The adhesive layer is between the chip substrate and the first sealing film, and is configured to allow the chip substrate to be adhered with the first sealing film, and the adhesive layer exposes the fluid channel of the chip substrate.

At least one embodiment of the present disclosure further provides a detection device, which is adapted to operate the detection chip provided by any one of the embodiments of the present disclosure. The detection device comprises a membrane valve control unit, the membrane valve control unit is configured to mount the detection chip and comprises at least one protruding portion, and the at least one protruding portion is movable to control the portion of the first sealing film covering the membrane valve portions whether to approach the membrane valve portions or whether to separate from the membrane valve portions in the case where the detection chip is mounted on the membrane valve control unit, so as to close and open the fluid channel correspondingly.

For example, the detection device provided by an embodiment of the present disclosure further comprises a film driving unit. In the case where the fluid channel comprises an extraction region, the film driving unit is configured to, in the case where the detection chip is mounted on the membrane valve control unit, apply pressure to a portion of the first sealing film covering the extraction region, so as to allow the portion of the first sealing film covering the extraction region to deform.

At least one embodiment of the present disclosure further provides a method for using the detection chip provided by any one of the embodiments of the present disclosure. The method comprises: controlling the plurality of membrane valve portions to allow the portion of the first sealing film covering the plurality of membrane valve portions to be separated from the plurality of membrane valve portions, respectively, so as to open the fluid channel correspondingly.

For example, in the method provided by an embodiment of the present disclosure, in the case where the plurality of membrane valve portions comprise a plurality of first membrane valve portions and a plurality of second membrane valve portions, the chip substrate comprises a plurality of liquid cells, and the fluid channel comprises an extraction region and a reaction region, controlling the plurality of membrane valve portions to allow the portion of the first sealing film covering the plurality of membrane valve portions to be separated from the plurality of membrane valve portions, respectively, so as to open the fluid channel correspondingly, comprises: controlling the plurality of first membrane valve portions to allow the plurality of liquid cells to be communicated with the extraction region, so as to allow liquid in the plurality of liquid cells to enter the extraction region; and controlling the plurality of second membrane valve portions to allow the reaction region to be communicated with the extraction region, so as to allow liquid in the extraction region to enter the reaction region.

For example, the method provided by an embodiment of the present disclosure further comprises: controlling flow of liquid in the detection chip by applying pressure to a portion of the first sealing film covering the extraction region.

BRIEF DESCRIPTION OF THE DRAWINGS

In order to clearly illustrate the technical solutions of the embodiments of the present disclosure, the drawings of the embodiments will be briefly described in the following. It is obvious that the described drawings are only related to some embodiments of the present disclosure and thus are not limitative to the present disclosure.

DETAILED DESCRIPTION

Figure 1:
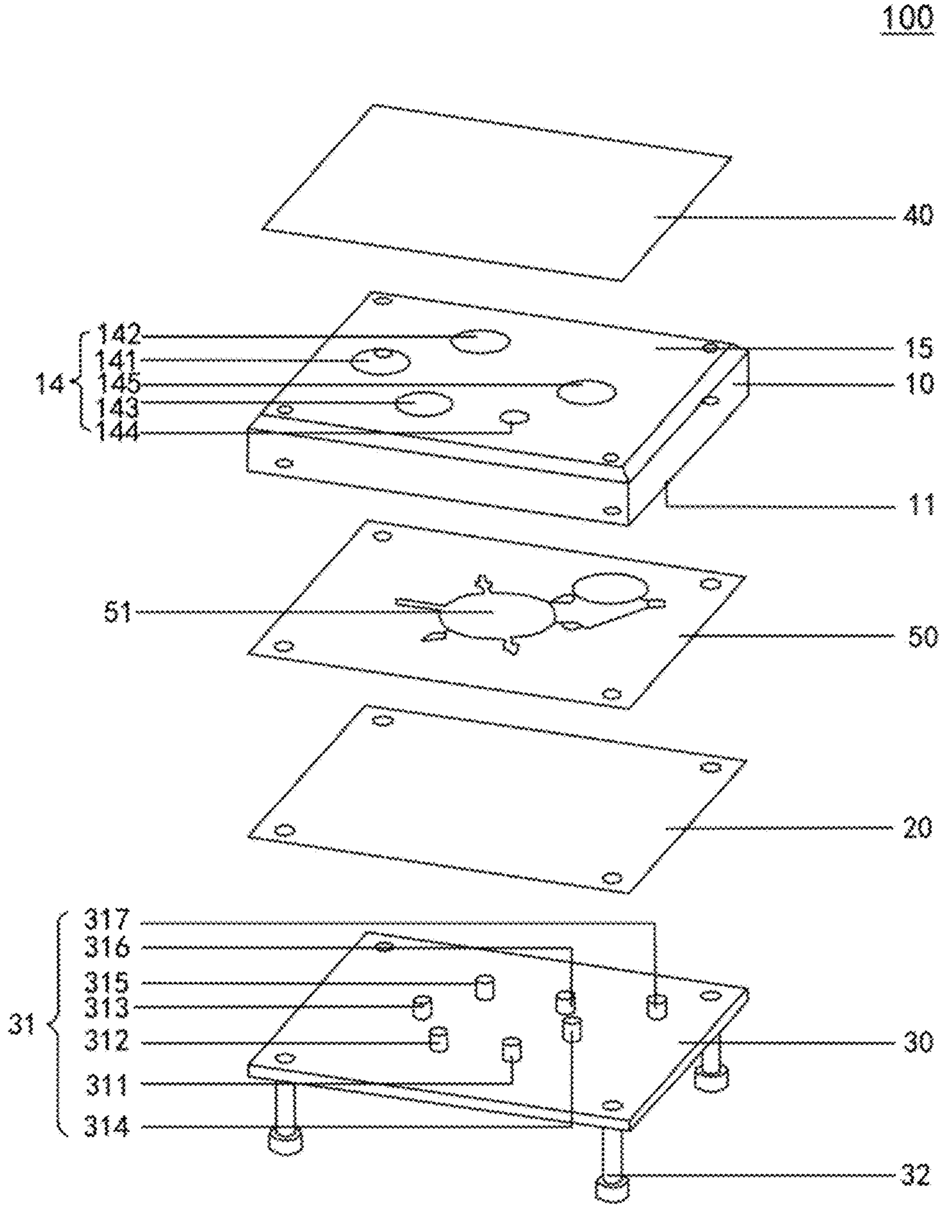
FIG. 1 is a perspective exploded view of a three-dimensional structure of a detection chip provided by at least one embodiment of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect," "connected," "coupled," etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In the design process of microfluidic chips, it is usually desirable to integrate as many functions of analysis and detection on the chip as possible to reduce the dependence of the chip on external operations, thereby achieving automation and integration. Microfluidic chips are mostly disposable products, which can omit the complicated liquid path system for cleaning, waste liquid treatment, or the like, and can further avoid pollution caused by the liquid path system. In order to achieve integration, the reagent storage component may be provided in the microfluidic chip to store various reagents required for analysis and detection. For the general microfluidic chip with the reagent storage function, the structure of the chip is relatively complicated, or the preparation process is relatively complicated, which causes the high cost of the microfluidic chip as a consumable, and the delivery of the reagent cannot be accurately and precisely controlled. Meanwhile, the process of the microfluidic chip that can realize multiple detection is more complicated, and the cost is relatively high.

At least one embodiment of the present disclosure provides a detection chip, a method for using a detection chip, and a detection device. The detection chip has a simple structure and can quantitatively deliver the reagent. Further, at least one example thereof can further realize multiple detection. Furthermore, at least one example thereof can further facilitate improving the heat conduction efficiency and the stability and accuracy of optical detection, and can effectively prevent the reagent leakage during transportation.

Hereinafter, the embodiments of the present disclosure will be described in detail with reference to the drawings. It should be noted that the same reference numerals in different drawings are used to refer to the same described elements.

At least one embodiment of the present disclosure provides a detection chip, and the detection chip includes a chip substrate and a first sealing film which are stacked. The chip substrate includes a first surface, and the first sealing film covers the first surface of the chip substrate. The chip substrate further includes a fluid channel on the first surface, and the fluid channel includes a plurality of membrane valve portions. The membrane valve portions are configured to allow a portion, covering the membrane valve portions, of the first sealing film to approach and separate, so as to close and open the fluid channel correspondingly, thereby allowing quantitative delivery of the reagent.

Figure 2:
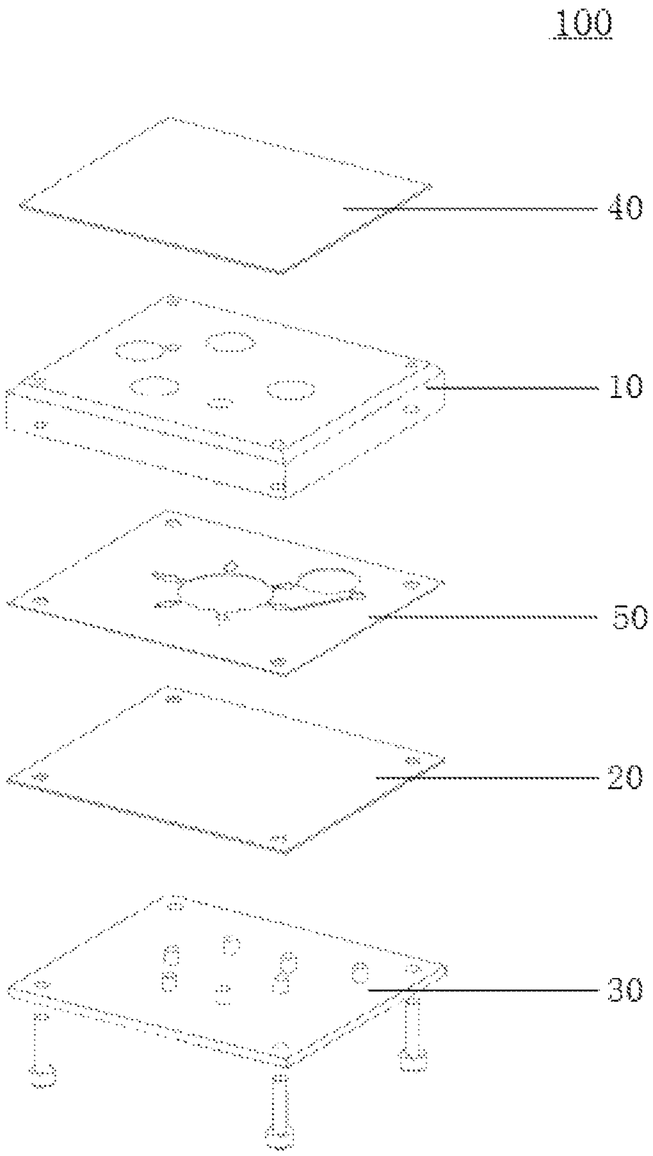
FIG. 2 is a non-perspective exploded view of the three-dimensional structure of the detection chip illustrated in FIG. 1.
Figure 3:
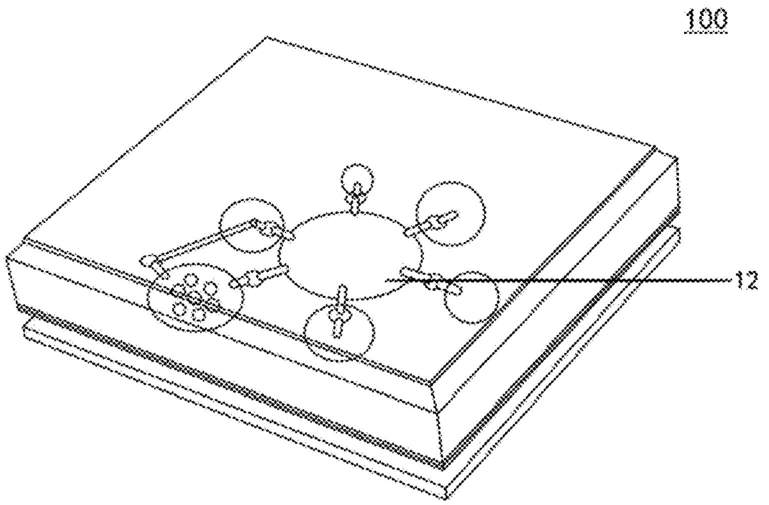
FIG. 3 is a perspective view of the three-dimensional structure of the detection chip illustrated in FIG. 1.
Figure 4:
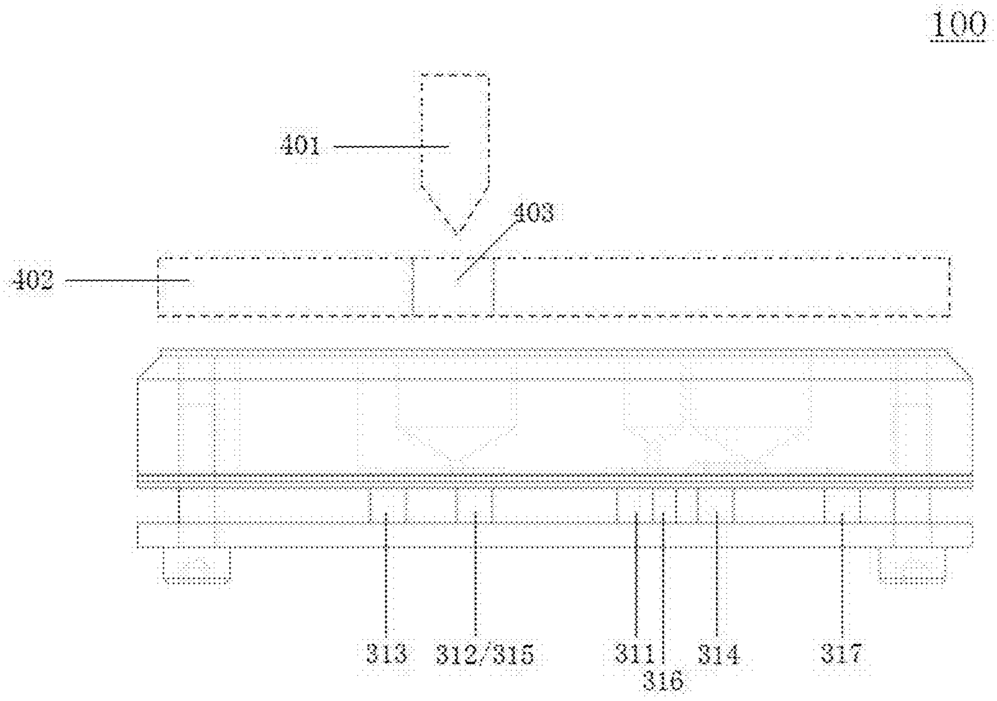
FIG. 4 is a side perspective view of the detection chip illustrated in FIG. 1.
Figure 5:
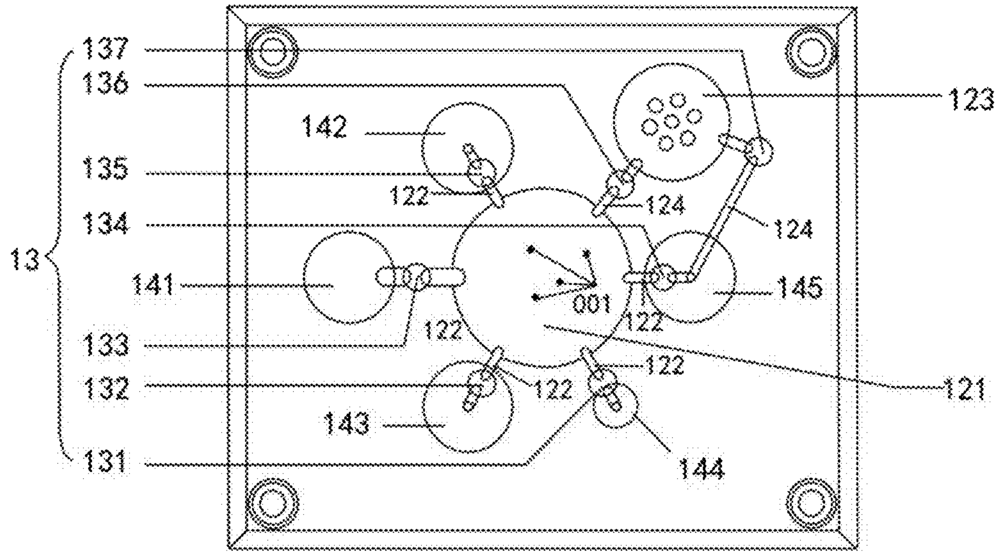
FIG. 5 is a top perspective view of the detection chip illustrated in FIG. 1.

FIG. 1 is a perspective exploded view of a three-dimensional structure of a detection chip provided by at least one embodiment of the present disclosure, FIG. 2 is a non-perspective exploded view of the three-dimensional structure of the detection chip illustrated in FIG. 1, FIG. 3 is a perspective view of the three-dimensional structure of the detection chip illustrated in FIG. 1, FIG. 4 is a side perspective view of the detection chip illustrated in FIG. 1, and FIG. 5 is a top perspective view of the detection chip illustrated in FIG. 1.

Hereinafter, the detection chip provided by some embodiments of the present disclosure is described with reference to FIG. 1 to FIG. 5.

As illustrated in FIG. 1 to FIG. 3, the detection chip 100 includes a chip substrate 10 and a first sealing film 20 which are stacked.

The chip substrate 10 includes a first surface 11 and a fluid channel 12 located on the first surface 11. For example, the first surface 11 is the lower surface of the chip substrate 10 illustrated in FIG. 1 to FIG. 3, and the fluid channel 12 is located on the lower surface of the chip substrate 10. For example, the material of the chip substrate 10 is polypropylene (PP), and the chip substrate 10 is processed by an injection molding process. By designing a corresponding injection mould, the fluid channel 12 can be formed on the first surface 11 of the chip substrate 10 in a recessed manner. Certainly, the embodiments of the present disclosure are not limited to this, and any applicable process, such as laser engraving, photolithography, or the like, may also be used to fabricate the fluid channel 12. It should be noted that in the embodiments of the present disclosure, the material and processing method of the chip substrate 10 are not limited, which can be determined according to actual requirements.

For example, the first sealing film 20 covers the first surface 11 of the chip substrate 10. Because the fluid channel 12 is provided on the first surface 11 of the chip substrate 10 in the form of recess, a space for liquid (for example, various reagents required for analysis and detection) flowing can be formed between the first sealing film 20 and the fluid channel 12. For example, a space for reagent reaction can also be formed. For example, the first sealing film 20 is an elastic film, such as an elastic transparent film. For example, the material of the first sealing film 20 is polyethylene terephthalate (PET) to have better elasticity and strength, so that the first sealing film 20 can be restored to the original state after elastic deformation. Certainly, the embodiments of the present disclosure are not limited to this, and the first sealing film 20 may also be made of other applicable materials, such as a polymer composite material of polystyrene (PS) and PET, so as to have better elasticity and strength.

As illustrated in FIG. 5, the fluid channel 12 includes a plurality of membrane valve portions 13, an extraction region 121, a plurality of first branches 122, a reaction region 123, and a plurality of second branches 124.

The membrane valve portion 13 is configured to allow the portion of the first sealing film 20 covering the membrane valve portion 13 to approach and separate, so that the fluid channel 12 can be closed and opened correspondingly. For example, under the action (for example, pressing) of a separately provided component, the portion of the first sealing film 20 covering the membrane valve portion 13 is squeezed and deformed, such as elastically deformed, so as to be close to the chip substrate 10 (for example, to be completely attached with the chip substrate 10), so that the space between the first sealing film 20 and the fluid channel 12 is reduced or even cut off at the membrane valve portion 13, and the liquid cannot pass through the membrane valve portion 13, so as to close the fluid channel 12 accordingly. For example, under the action (for example, loosening) of a separately provided component, the portion of the first sealing film 20 covering the membrane valve portion 13 and being contacted with the chip substrate 10 is recovered, thereby being separated from the chip substrate 10, so that the space between the first sealing film 20 and the fluid channel 12 is restored at the membrane valve portion 13, and the liquid can pass through the membrane valve portion 13, so as to correspondingly open the fluid channel 12.

For example, the membrane valve portion 13 is a circular recess as illustrated in FIG. 5. Accordingly, the separately provided component for controlling the membrane valve portion 13 is a cylindrical protrusion, so that the membrane valve portion 13 can be squeezed. Certainly, the embodiments of the present disclosure are not limited to this, the membrane valve portion 13 may also be in any other applicable shapes, such as a rectangle, a hexagon, an ellipse, etc., and correspondingly, the separately provided component for controlling the membrane valve portion 13 may be a columnar protrusion with a cross-sectional shape of, e.g., a rectangle, a hexagon, an ellipse, etc., so that the membrane valve portion 13 can be squeezed.

For example, the chip substrate 10 further includes at least one liquid cell 14, and the at least one liquid cell 14 is communicated with the fluid channel 12. For example, in some examples, as illustrated in FIG. 1 and FIG. 5, the at least one liquid cell 14 includes a plurality of liquid cells, for example, five liquid cells, namely, a first liquid cell 141, a second liquid cell 142, a third liquid cell 143, a fourth liquid cell 144, and a fifth liquid cell 145. The first liquid cell 141 is configured to contain a lysis solution, the second liquid cell 142 is configured to contain a first rinsing liquid, the third liquid cell 143 is configured to contain a second rinsing liquid, the fourth liquid cell 144 is configured to contain an eluent, and the fifth liquid cell 145 is configured to accommodate a waste liquid generated in the extraction region 121 during the reaction process.

For example, at least one of the plurality of membrane valve portions 13 is configured to close and open the portion of the fluid channel 12 communicated with at least one liquid cell 14. For example, in some examples, as illustrated in FIG. 1 and FIG. 5, the plurality of first branches 122 are communicated with the plurality of liquid cells 14 in one-to-one correspondence, and each of the plurality of first branches 122 is communicated with the extraction region 121. The plurality of membrane valve portions 13 include a plurality of first membrane valve portions 131 to 135 respectively located on the plurality of first branches 122, so as to control the plurality of first branches 122 to be opened or closed. The liquid stored in the plurality of liquid cells 14 can enter the extraction region 121 along the first branch 122, so as to facilitate operations such as extraction, rinsing, elution, or the like in the extraction region 121.

For example, the extraction region 121 includes a plurality of magnetic beads 001, and the plurality of magnetic beads 001 are movably distributed in the extraction region 121. For example, the surface of the magnetic bead 001 is processed with modified treatment. In the case where the detection chip 100 is used for detection, for example, in the case where the detection chip 100 is used to detect specific nucleic acid fragments, the magnetic bead 001 can allow molecular structures such as the nucleic acid fragments to be bonded to the magnetic bead 001 during the extraction process when detection is performed, so as to achieve the function of extraction. For example, the molecular structures such as the aforementioned nucleic acid fragments are obtained after the sample to be detected is split. The description of modifying the surface of the magnetic bead 001 may refer to the conventional design, which will not be described in detail here.

For example, the reaction region 123 is communicated with the extraction region 121 and at least one of the plurality of liquid cells 14 (for example, communicated with the fifth liquid cell 145) through the plurality of second branches 124, respectively. The plurality of membrane valve portions 13 further include a plurality of second membrane valve portions 136 to 137 respectively located on the plurality of second branches 124, so as to control the plurality of second branches 124 to be open or closed. For example, the reaction region 123 can contain the reaction liquid after operations such as extraction, rinsing, elution, etc., and allow the reaction liquid to perform the amplification reaction and to be subjected with subsequent optical detection in the reaction region 123. For example, in the case where the reaction region 123 and the extraction region 121 are communicated with each other, the reaction region 123 is communicated with the fifth liquid cell 145, so that the fifth liquid cell 145 can function as a vent hole, thereby facilitating allowing the reaction liquid to enter the reaction region 123 from the extraction region 121. For example, when the reaction liquid enters the reaction region 123, the pressure in the reaction region 123 increases, and the excess air in the reaction region 123 can be discharged to the fifth liquid cell 145 through the second branch 124, so as to balance the air pressure and facilitate allowing the reaction liquid to enter the reaction region 123.

Thus, by providing the first branches 122 and the second branches 124, and correspondingly providing the first membrane valve portions 131 to 135 and the second membrane valve portions 136 to 137, each liquid cell 14 can be individually controlled whether to be communicated with the extraction region 121, and the reaction region 123 can be controlled whether to be communicated with the extraction region 121, so that the detection chip 100 can be operated to realize the function of the detection chip 100.

In the embodiments of the present disclosure, the membrane valve portion 13 can control whether the liquid in the fluid channel 12 passes or not, and can be used as a sealed valve of the liquid cell 14 to control when the liquid cell 14 is opened to release the reagent therein. Because the amount of the reagent passed is basically fixed during the membrane valve portion 13 being opened once, the membrane valve portion 13 can also quantitatively deliver the reagent to realize microliter-level liquid transmission.

It should be noted that although the extraction region 121 and the reaction region 123 illustrated in FIG. 5 are circular depressions, this does not constitute a limitation to the embodiments of the present disclosure. The extraction region 121 and the reaction region 123 may also be depressions in any other applicable shape, such as a rectangle, a hexagon, an ellipse, etc., as long as a space for accommodating the liquid can be formed, and the embodiments of the present disclosure are not limited in this aspect.

The respective sizes of the membrane valve portion 13, the extraction region 121, the first branch 122, the reaction region 123, and the second branch 124 are not limited, which may be determined according to actual needs, as long as the membrane valve portion 13 can be ensured to control the first branch 122 and the second branch 124 to be opened and closed.

It should be noted that, in the embodiments of the present disclosure, the first sealing film 20 is, for example, an elastic transparent plastic thin film (such as a PET film), and the first sealing film 20 has certain elasticity and strength, and is pushed up and down and pulled up and down after applying positive and negative pressure (for example, positive and negative air pressure) to the portion of the first sealing film 20 covering the extraction region 121. Therefore, in the case where the fluid channel 12 is not closed, the liquid can be pumped quantitatively, thereby controlling the flow of the liquid between each liquid cell 14, the extraction region 121, and the reaction region 123. Because the first sealing film 20 is thin and can achieve rapid heat conduction, heat can be transferred quickly when the reaction liquid in the reaction region 123 is heated, which can facilitate improving the heat conduction efficiency and speeding up the amplification reaction. The first sealing film 20 is a transparent thin film, so that when performing optical detection on the liquid in the reaction region 123 that completes the amplification reaction, the light transmittance is higher, which facilitates improving the stability and accuracy of the optical detection.

For example, as illustrated in FIG. 1 to FIG. 4, in at least one embodiment of the present disclosure, the detection chip 100 may further include a membrane valve sealing plate 30. The membrane valve sealing plate 30 is provided on a side of the first sealing film 20 away from the chip substrate 10, and for example, the membrane valve sealing plate 30 is provided adjacent to the first sealing film 20. The membrane valve sealing plate 30 includes a plurality of protruding structures 31. The plurality of protruding structures 31 and the plurality of membrane valve portions 13 are in one-to-one correspondence, and in the case where the plurality of protruding structures 31 are respectively in contact with the plurality of membrane valve portions 13, the fluid channel 12 is closed.

For example, the plurality of protruding structures 31 include seven protruding structures 311 to 317, and correspondingly, the plurality of membrane valve portions 13 also include seven membrane valve portions 131 to 137. The seven protruding structures 311 to 317 are correspondingly distributed according to the distribution positions of the seven membrane valve portions 131 to 137, so that each protruding structure 31 can be correspondingly inserted into each membrane valve portion 13 at the same time. Thus, in the case where each protruding structure 31 and each membrane valve portion 13 are correspondingly in contact with each other (as illustrated in FIG. 4), the portion of the first sealing film 20 covering the membrane valve portion 13 is squeezed and deformed to be completely attached to the chip substrate 10, thereby allowing the fluid channel 12 to be closed.

For example, because the membrane valve portion 13 is a circular depression as illustrated in FIG. 5, the protruding structure 31 is a cylindrical protrusion. When the shape of the membrane valve portion 13 changes, in order to achieve a better matching effect, the shape of the protruding structure 31 needs to be changed accordingly.

For example, the membrane valve sealing plate 30 can be fixed on the chip substrate 10 by screw connection (for example, a screw 32), clamping, and other fixing methods, and the first sealing film 20 is located between the membrane valve sealing plate 30 and the chip substrate 10. For example, the fixing method is a detachable fixing method. For example, during transportation or before the detection chip 100 is used, the membrane valve sealing plate 30 is fixed on the chip substrate 10, so that the fluid channel 12 can be closed, so as to enable the liquid in each liquid cell 14 not to leak or mix. When the detection chip 100 is used, the membrane valve sealing plate 30 is separated from the chip substrate 10, and a separately provided device (such as a detection device including a plurality of cylindrical protrusions which can be independently controlled) is used to control each membrane valve portion 13, thereby achieving the function of the detection chip 100.

For example, the material of the membrane valve sealing plate 30 may be acrylonitrile butadiene styrene (ABS) plastic, or other applicable materials, which are not limited in the embodiments of the present disclosure.

For example, as illustrated in FIG. 1 to FIG. 4, in at least one embodiment of the present disclosure, the detection chip 100 may further include a second sealing film 40. The chip substrate 10 includes a second surface 15 opposite to the first surface 11, and the second sealing film 40 covers the second surface 15 of the chip substrate 10. For example, the second surface 15 is the upper surface of the chip substrate 10 illustrated in FIG. 1 to FIG. 4, and the second sealing film 40 covers the upper surface of the chip substrate 10. The second sealing film 40 can be provided to cooperate with the membrane valve portion 13 to seal the liquid in the liquid cell 14 within the liquid cell 14, so as to prevent the liquid in the liquid cell 14 from leaking during transportation.

For example, the second sealing film 40 is a composite film including metal foil and a polymer material which are stacked, such as a composite film of aluminum foil and a polymer material, so as to facilitate the bonding with the chip substrate 10 by heat pressing, and further facilitate being punctured when the sample needs to be added. For example, as illustrated in FIG. 4, when the detection chip 100 is used, a separately provided piercing mechanism 401 (for example, any applicable hard object) may be used to pierce the second sealing film 40, so as to add the sample to the first liquid cell 141 through the puncture on the second sealing film 40. For example, in some other examples, the detection chip 100 may also include the piercing mechanism 401 and further include a piercing mechanism fixing plate 402. The piercing mechanism fixing plate 402 has openings 403 corresponding to the piercing mechanism 401, the piercing mechanism 401 is disposed in the opening 403, and the piercing mechanism 401 can move along the axial direction of the opening 403 in the opening 403.

For example, as illustrated in FIG. 1 to FIG. 4, in at least one embodiment of the present disclosure, the detection chip 100 may further include an adhesive layer 50. The adhesive layer 50 is provided between the chip substrate 10 and the first sealing film 20, and is configured to adhere the chip substrate 10 with the first sealing film 20. For example, the adhesive layer 50 may include an adhesive material such as an acrylic adhesive, or the like, and for example, may be implemented as a double-sided tape. For example, the chip substrate 10, the adhesive layer 50, and the first sealing film 20 have substantially the same contours, so that the adhesive layer 50 can achieve a stronger bond between the chip substrate 10 and the first sealing film 20.

For example, the adhesive layer 50 exposes the fluid channel 12 of the chip substrate 10, that is, the adhesive layer 50 includes a hollow region 51, and the shape of the hollow region 51 is the same as or substantially the same as the orthographic projection of the fluid channel 12 on the adhesive layer 50, so as to facilitate forming a space for liquid flow and reagent reaction between the first sealing film 20 and the fluid channel 12.

For example, in some other examples, in the case where the first sealing film 20 is bonded to the chip substrate 10 by ultrasonic welding, photosensitive adhesive bonding, chemical solvent bonding, laser welding, or the like, the adhesive layer 50 may be omitted.

Figure 6:
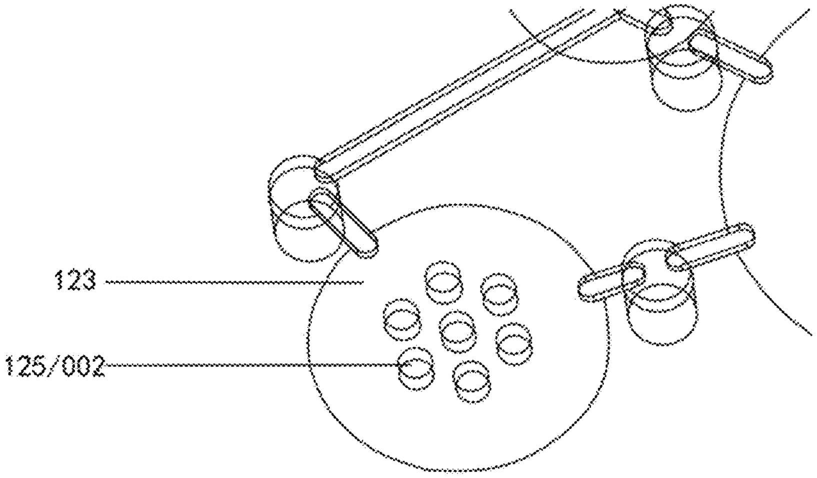
FIG. 6 is a partial enlarged perspective view of a reaction region of a detection chip provided by at least one embodiment of the present disclosure.

FIG. 6 is a partial enlarged perspective view of a reaction region of a detection chip provided by at least one embodiment of the present disclosure. For example, as illustrated in FIG. 6, the reaction region 123 includes a porous structure 125, the porous structure 125 includes a plurality of liquid containing holes 002, and the plurality of liquid containing holes 002 are configured to contain the same or different amplification primers. For example, the amplification primer is a lyophilized reagent, and the reaction liquid entering the reaction region 123 can re-thaw the lyophilized reagent, and the desired reaction (such as an amplification reaction) occurs, so that the optical detection can be performed after the reaction is completed. In the case where the liquid containing holes 002 store different amplification primers, the reaction liquid entering respective liquid containing holes 002 may undergo different amplification reactions (that is, the amplified objects are different), so that multiple objects can be detected (such as different types of viruses) to achieve multiple detection. Because the amplification primer is the lyophilized reagent, the amplification primer stored in different liquid containing hole 002 may not be mixed with each other during transportation, and may not be moved out of the liquid containing hole 002. It should be noted that, in the embodiments of the present disclosure, the cross-sectional shape, number, and distribution method of the liquid containing holes 002 are not limited, which can be determined according to actual requirements.

The working principle of the detection chip 100 is exemplified below.

In the production process, the lysis solution is pre-embedded in the first liquid cell 141, the first rinsing liquid is pre-embedded in the second liquid cell 142, the second rinsing liquid is pre-embedded in the third liquid cell 143, the eluent is pre-embedded in the fourth liquid cell 144, the fifth liquid cell 145 is vacant, and the amplification primer is pre-embedded in the liquid containing holes 002 of the reaction region 123. The membrane valve sealing plate 30 is mounted on the chip substrate 10, so that the plurality of protruding structures 31 are in contact with the plurality of membrane valve portions 13, respectively, thereby allowing the fluid channel 12 to be closed and sealing the liquid of each liquid cell 14 within the corresponding liquid cell 14. For example, taking it as an example that the human papillomavirus is the sample to be detected, the components of the lysis solution are guanidine hydrochloride, 3-(N-morpholine) propanesulfonic acid (MOPS), and a mixture of polyoxyethylene sorbitan monolaurate and polyoxyethylene dihydrosorbitol monolaurate (Tween), the first rinsing liquid consists of guanidine hydrochloride, MOPS, and isopropanol, the second rinsing liquid consists of guanidine hydrochloride, MOPS, and ethanol, and the eluent consists of trihydroxymethyl aminomethane (Tris) and ethylene diamine tetraacetic acid (EDTA).

During use, the membrane valve sealing plate 30 is separated from the chip substrate 10, and the detection chip 100 is mounted on a separately provided detection device. For example, the detection device includes a plurality of protruding portions, the plurality of protruding portions and the plurality of membrane valve portions 13 are in one-to-one correspondence, and each membrane valve portion 13 can be individually controlled.

First, the portion of the second sealing film 40 covering the first liquid cell 141 is pierced, and the sample to be detected is added to the first liquid cell 141. For example, any suitable hard object can be used to pierce the second sealing film 40. The sample to be detected is, for example, blood, body fluid, etc., which is not limited in the embodiments of the present disclosure. The sample to be detected is lysed (for example, the lysis temperature range may be determined according to actual requirements) under the action of the lysis solution in the first liquid cell 141, thereby being lysed to obtain nucleic acid fragments. The protruding portion in the detection device is controlled to open the first membrane valve portion 133, and the detection device is used to apply low-frequency positive and negative air pressure (or only apply negative air pressure or positive air pressure depending on the actual situation) to the portion of the first sealing film 20 covering the extraction region 121, so as to drive the liquid in the first liquid cell 141 to flow into the extraction region 121. Then, the first membrane valve portion 133 is closed. The high-frequency positive and negative air pressure is applied to the portion of the first sealing film 20 covering the extraction region 121, so that the portion of the first sealing film 20 covering the extraction region 121 vibrates repeatedly, so that the liquid in the extraction region 121 vibrates, which facilitates the bonding of the magnetic bead 001 pre-embedded in the extraction region 121 with the nucleic acid fragments in the liquid, thereby achieving the extraction of the nucleic acid fragments.

Then, the protruding portion in the detection device is controlled to open the first membrane valve portion 135, and the above-mentioned air pressure applying method is used to apply the air pressure to the portion of the first sealing film 20 covering the extraction region 121, so that the first rinsing liquid pre-embedded in the second liquid cell 142 is injected into the extraction region 121. Next, the first membrane valve portion 135 is closed, and high-frequency positive and negative air pressure is applied to the portion of the first sealing film 20 covering the extraction region 121, so that the portion of the first sealing film 20 covering the extraction region 121 vibrates repeatedly, thereby allowing the liquid in the extraction region 121 to vibrate, so as to wash away the protein. Then, the first membrane valve portion 134 is opened, and the magnet in the detection device is used to attract the magnetic beads 001 in the extraction region 121 (for example, the magnet is moved up to be close to the portion of the first sealing film 20 that covers the extraction region 121). Air pressure is applied to the first sealing film 20 to drive the liquid in the extraction region 121 to flow into the fifth liquid cell 145. At this time, because the magnetic beads 001 are fixed in the extraction region 121 under the attractive force of the magnet, the nucleic acid fragments adsorbed on the magnetic beads 001 may not enter the fifth liquid cell 145 along with the liquid. For example, the fifth liquid cell 145 serves as a waste liquid container for containing the waste liquid generated in the extraction region 121. Then, the first membrane valve portion 134 is closed and the magnet is removed.

Then, the first membrane valve portion 132 is opened, and the air pressure is applied to the portion of the first sealing film 20 covering the extraction region 121 by the above-mentioned air pressure applying method, thereby driving the second rinsing liquid pre-embedded in the third liquid cell 143 to flow into the extraction region 121. Next, the first membrane valve portion 132 is closed, and the high-frequency positive and negative air pressure is applied to the portion of the first sealing film 20 that covers the extraction region 121, so that the portion of the first sealing film 20 that covers the extraction region 121 vibrates repeatedly, thereby allowing the liquid in the extraction region 121 to vibrate, so as to wash away salt ions and some small molecules. Then, the first membrane valve portion 134 is opened, and the magnet in the detection device is used to attract the magnetic beads 001 in the extraction region 121. Air pressure is applied to the portion of the first sealing film 20 covering the extraction region 121, so as to drive the liquid in the extraction region 121 to flow into the fifth liquid cell 145. Then, the first membrane valve portion 134 is closed and the magnet is removed.

Then, the first membrane valve portion 131 is opened, and the air pressure is applied to the portion of the first sealing film 20 covering the extraction region 121 by the above-mentioned air pressure applying method, so that the eluent pre-embedded in the fourth liquid cell 144 is injected into the extraction region 121. The nucleic acid fragments adsorbed on the magnetic beads 001 are melted and eluted by the eluent, and are separated from the magnetic beads 001. Next, the first membrane valve portion 131 is closed, and the second membrane valve portions 136 and 137 are opened. The air pressure is applied to the portion of the first sealing film 20 covering the extraction region 121 by the above-mentioned air pressure applying method, and the liquid containing the eluted nucleic acid fragments is injected into the reaction region 123. At this time, the reaction region 123 is communicated with the fifth liquid cell 145 to use the fifth liquid cell 145 as a vent hole, so as to facilitate the liquid entering the reaction region 123. In the process of driving the liquid to flow into the reaction region 123, the magnet in the detection device is used to attract the magnetic beads 001 in the extraction region 121, so as to prevent the magnetic beads 001 from entering the reaction region 123. Then the second membrane valve portions 136 and 137 are closed.

Finally, the first membrane valve portion 134 is opened, and the magnet in the detection device is moved down to be away from the first sealing film 20, so that the magnetic beads 001 can be moved and driven into the fifth liquid cell 145 along with the waste liquid. The amplification primer embedded in the liquid containing hole 002 of the reaction region 123 is melted by the liquid entering the liquid containing hole 002. The temperature control unit in the detection device is used to control the temperature of the portion of the first sealing film 20 covering the reaction region 123, so that the nucleic acid fragments in the reaction region 123 undergo constant temperature amplification or polymerase chain reaction (PCR). Then, the amplified product is analyzed and detected by the optical detection unit of the detection device, so as to complete the detection and obtain the detection result. In the case where the amplification primers embedded in the plurality of liquid containing holes 002 are different, multiple detection can be realized.

Through the above steps, the detection chip 100 can be used to realize the analysis and detection of the sample to be detected. The detection chip 100 has a simple structure and a simple manufacturing process, and can improve the product yield, reduce the production cost, quantitatively deliver the reagent, achieve multiple detection, facilitate improving the heat conduction efficiency and the stability and accuracy of optical detection, and further effectively prevent leakage of the reagent during transportation.

At least one embodiment of the present disclosure further provides a detection device, which is adapted to operate the detection chip according to any one of the embodiments of the present disclosure. The detection device can operate the aforementioned detection chip and can quantitatively deliver the reagent. Further, at least one example thereof can also realize multiple detection. Furthermore, at least one example thereof can also facilitate improving the heat conduction efficiency and the stability and accuracy of optical detection.

Figure 7A:
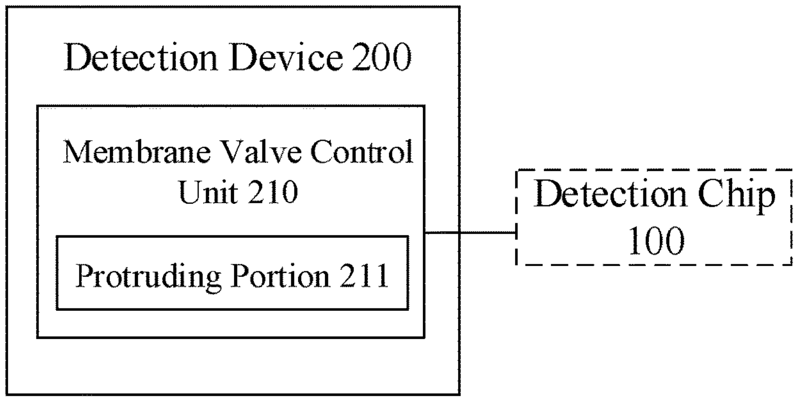
FIG. 7A is a schematic block diagram of a detection device provided by at least one embodiment of the present disclosure.

FIG. 7A is a schematic block diagram of a detection device provided by at least one embodiment of the present disclosure. For example, as illustrated in FIG. 7A, a detection device 200 is adapted to operate the aforementioned detection chip 100, and the detection device 200 includes a membrane valve control unit 210.

For example, the membrane valve control unit 210 is configured to mount the detection chip 100, that is, after the membrane valve sealing plate 30 in the detection chip 100 is separated from the chip substrate 10, the detection chip 100 can be mounted on the membrane valve control unit 210. For example, in some examples, when the membrane valve sealing plate 30 is removed, the detection chip 100 is turned upside down, so as to prevent the liquid in each liquid cell 14 from flowing out of the liquid cell 14 after the membrane valve sealing plate 30 is removed. After the detection chip 100 is kept upside down and mounted on the membrane valve control unit 210, the membrane valve portion 13 is closed, and then the detection chip 100 is turned over with the structure in contact with the membrane valve control unit 210, so as to allow the detection chip 100 to be upright.

Figure 7B:
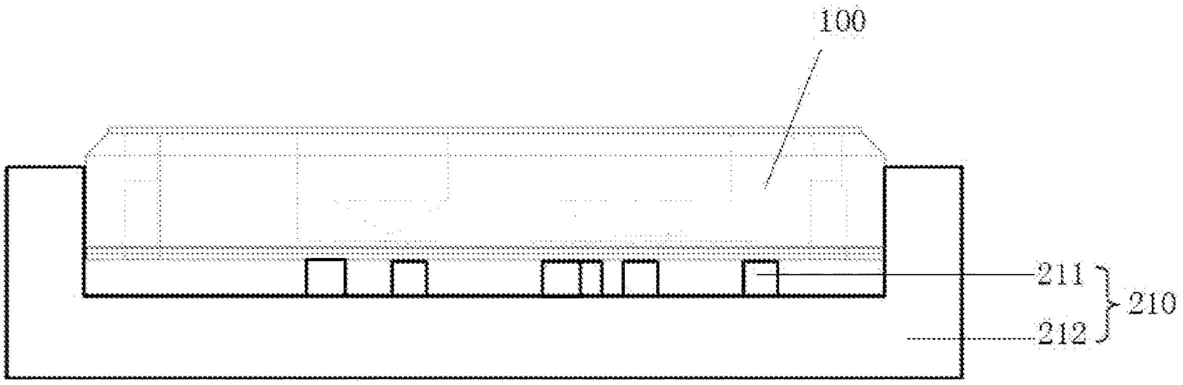
FIG. 7B is a schematic structural diagram of a detection device provided by at least one embodiment of the present disclosure.

FIG. 7B is a schematic structural diagram of a detection device provided by at least one embodiment of the present disclosure. For example, the detection device provided in this embodiment is basically the same as the detection device illustrated in FIG. 7A. For example, the membrane valve control unit 210 includes a main body portion 212 and at least one protruding portion 211 provided on the main body portion 212. The main body portion 212 has a fixing structure for accommodating the above-mentioned detection chip 100, for example, by means of clamping, bonding, etc., so as to fix the detection chip 100. At least one protruding portion 211 can be moved (for example, protruding or retracting with respect to the main body portion 212) to control the portion of the first sealing film 20 covering the membrane valve portion 13 whether to approach the membrane valve portion 13 or whether to separate from the membrane valve portion 13 in the case where the detection chip 100 is mounted on the membrane valve control unit 210, so as to enable the fluid channel 12 to be closed and opened correspondingly. For example, the protruding portion 211 may be driven by methods such as pneumatic, hydraulic or other suitable means, or the protruding portion 211 may be driven by a stepping motor, and these driving components are provided within the main body portion 212 of the membrane valve control unit 210.

For example, the function of the protruding portion 211 may be similar to the function of the aforementioned protruding structure 31, that is, there may be a plurality of protruding portions 211 in one-to-one correspondence with the plurality of membrane valve portions 13, so as to control the plurality of membrane valve portions 13 to be opened and closed, respectively. In the detection device 200, the membrane valve control unit 210 can independently control each protruding portion 211, and in the case where the protruding portion 211 and the corresponding membrane valve portion 13 are in contact with each other, the fluid channel 12 can be closed.

For example, in some examples, there are seven protruding portions 211, which correspond to the distribution positions of the seven membrane valve portions 131 to 137 in the detection chip 100 illustrated in FIG. 1 to FIG. 6. Each protruding portion 211 can be individually controlled, for example, can be moved upwards respectively, so that each protruding portion 211 can be inserted into each membrane valve portion 13 correspondingly, so as to allow the portion of the first sealing film 20 covering the membrane valve portion 13 to be squeezed and deformed to be completely attached to the chip substrate 10, thereby allowing the fluid channel 12 to be closed. When the fluid channel 12 needs to be opened, the corresponding protruding portion 211 is moved down and away from the membrane valve portion 13, and the deformation of the portion of the first sealing film 20 covering the membrane valve portion 13 is restored to be separated from the chip substrate 10, so that the fluid channel 12 can be opened. For example, the protruding portion 211 may be a cylindrical protrusion, so as to cooperate with the circular membrane valve portion 13.

It should be noted that, in the embodiments of the present disclosure, as described above, the specific implementation of the membrane valve control unit 210 is not limited. For example, the membrane valve control unit 210 may be a combination of a hydraulic device, a propulsion control mechanism (such as a control circuit or a control chip), a cylinder (serving as the protruding portion 211), and a position limiting mechanism, or may also be a combination of a motor, a propulsion control mechanism, a cylinder, and a position limiting mechanism, or in any other implementation manner, which can be determined according to actual requirements.

Figure 8:
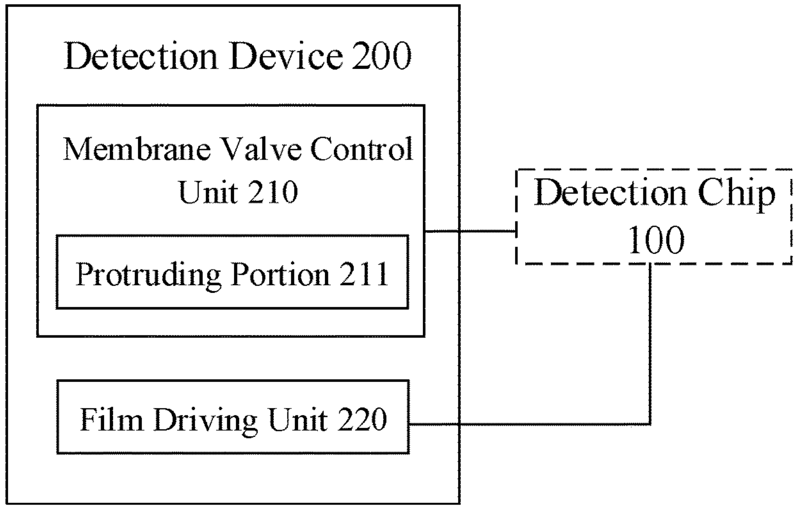
FIG. 8 is a schematic block diagram of another detection device provided by at least one embodiment of the present disclosure.

FIG. 8 is a schematic block diagram of another detection device provided by at least one embodiment of the present disclosure. For example, as illustrated in FIG. 8, except for further including a film driving unit 220, the detection device 200 provided in this embodiment is basically the same as the detection device 200 illustrated in FIG. 7A. In this embodiment, in the case where the fluid channel 12 of the detection chip 100 includes the extraction region 121, the film driving unit 220 is configured to, in the case where the detection chip 100 is mounted on the membrane valve control unit 210, apply pressure to the portion of the first sealing film 20 covering the extraction region 121 so as to allow the portion of the first sealing film 20 covering the extraction region 121 to deform, for example, to repeatedly vibrate. The portion of the first sealing film 20 covering the extraction region 121 is pushed up and down and squeezed, and thus in the case where the fluid channel 12 is not closed, the liquid can be pumped quantitatively, so as to control the flow of the liquid in the detection chip 100.

For example, in some examples, the film driving unit 220 may be an air pressure applying unit. The film driving unit 220 is configured to, in the case where the detection chip 100 is mounted on the membrane valve control unit 210, apply air pressure to the portion of the first sealing film 20 covering the extraction region 121 of the fluid channel 12. For example, the air pressure may be alternating positive air pressure and negative air pressure, or may be only positive air pressure or only negative air pressure, which is not limited in the embodiments of the present disclosure. For example, the changing frequency of alternating positive air pressure and negative air pressure can be adjusted, so that a high frequency of changing air pressure and a low frequency of changing air pressure can be provided. The changing air pressure with the high frequency enables the liquid in the extraction region 121 to vibrate, so as to better perform operations such as extraction, rinsing, elution, etc. The changing air pressure with the low frequency can pump the liquid, so that the liquid can flow between the liquid cells 14, the extraction region 121, and the reaction region 123.

It should be noted that in the embodiments of the present disclosure, the specific implementation manner of the film driving unit 220 is not limited. For example, the film driving unit 220 may be a combination of a pressure control device, an air compressor, and a gas delivery pipe, or may also be in any other implementation manner, which can be determined according to actual needs.

It should be noted that, in the embodiments of the present disclosure, the detection device 200 may further include more components and units, which are not limited to the membrane valve control unit 210 and the film driving unit 220 described above. For example, the detection device 200 may also include a power supply, a central processing unit (CPU), an optical detection unit, a temperature control unit, etc., so that the detection device 200 may have complete and rich functions. The detailed description and technical effects of the detection device 200 may be referred to the above description of the detection chip 100, and details are not described herein again.

At least one embodiment of the present disclosure further provides a method for using a detection chip, and the method can be used to operate the detection chip described in any one of the embodiments of the present disclosure. By adopting this method, the reagent can be delivered quantitatively. Further, at least one example thereof can also realize multiple detection. Furthermore, at least one example thereof can also facilitate improving the heat conduction efficiency and the stability and accuracy of optical detection.

Figure 9:
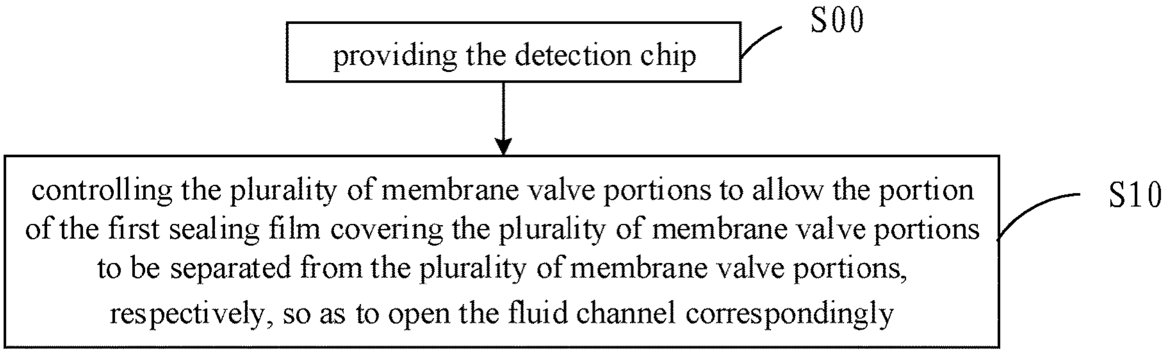
FIG. 9 is a schematic flowchart of a method for using a detection chip provided by at least one embodiment of the present disclosure.

FIG. 9 is a schematic flowchart of a method for using a detection chip provided by at least one embodiment of the present disclosure. For example, as illustrated in FIG. 9, in some examples, the method includes following operations.

Step S00: providing the detection chip 100.

Step S10: controlling the plurality of membrane valve portions 13 to allow the portion of the first sealing film 20 covering the plurality of membrane valve portions 13 to be separated from the plurality of membrane valve portions 13, respectively, so as to open the fluid channel 12 correspondingly.

Figure 10:
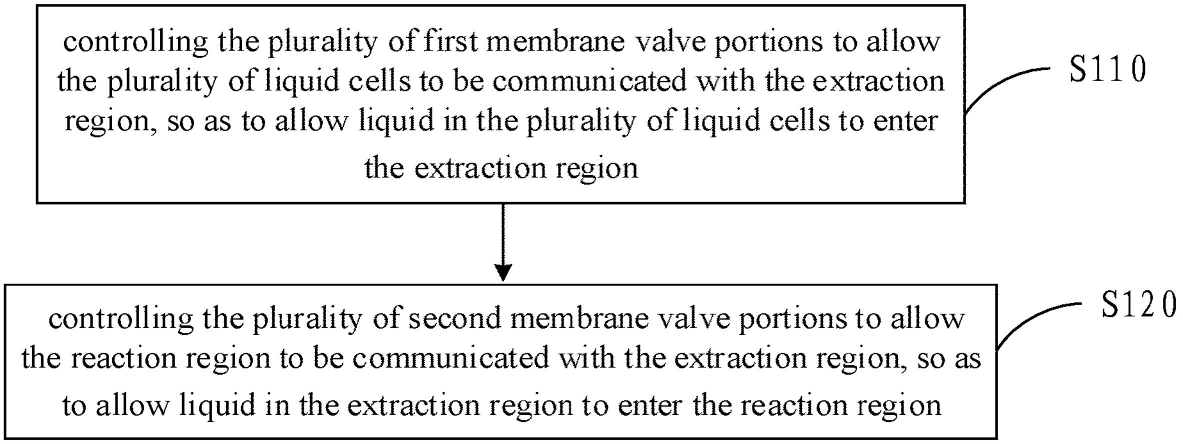
FIG. 10 is a schematic flowchart of step S10 of the method for using the detection chip illustrated in FIG. 9.

FIG. 10 is a schematic flowchart of step S10 of the method for using the detection chip illustrated in FIG. 9. For example, as illustrated in FIG. 10, in some examples, in the case where the plurality of membrane valve portions 13 include a plurality of first membrane valve portions 131 to 135 and a plurality of second membrane valve portions 136 to 137, the chip substrate 10 includes a plurality of liquid cells 14, and the fluid channel 12 includes an extraction region 121 and a reaction region 123, the above step S10 further includes following operations.

Step S110: controlling the plurality of first membrane valve portions 131 to 135 to allow the plurality of liquid cells 14 to be communicated with the extraction region 121, so as to allow liquid in the plurality of liquid cells 14 to enter the extraction region 121.

Step S120: controlling the plurality of second membrane valve portions 136 to 137 to allow the reaction region 123 to be communicated with the extraction region 121, so as to allow liquid in the extraction region 121 to enter the reaction region 123.

For example, in step S110, by controlling the first membrane valve portions 131 to 135, the plurality of liquid cells 14 can be sequentially communicated (for example, communicated in different operation phases, respectively) with the extraction region 121 of the fluid channel 12, so that the liquid in the plurality of liquid cells 14 enters the extraction region 121 sequentially (for example, enters the extraction region 121 in different operation phases, respectively).

Figure 11:
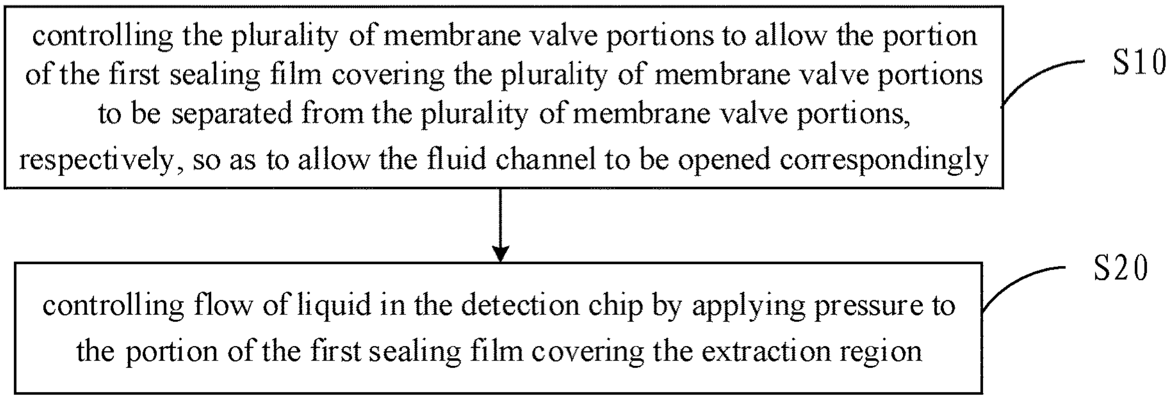
FIG. 11 is a schematic flowchart of another method for using the detection chip provided by at least one embodiment of the present disclosure.

FIG. 11 is a schematic flowchart of another method for using the detection chip provided by at least one embodiment of the present disclosure.

For example, as illustrated in FIG. 11, in some examples, the method includes following operations.

Step S10: controlling the plurality of membrane valve portions 13 to allow the portion of the first sealing film 20 covering the plurality of membrane valve portions 13 to be separated from the plurality of membrane valve portions 13, respectively, so as to allow the fluid channel 12 to be opened correspondingly.

Step S20: controlling flow of liquid in the detection chip 100 by applying pressure to the portion of the first sealing film 20 covering the extraction region 121.

For example, step S10 in this embodiment is basically the same as step S10 of the method illustrated in FIG. 9, and details are not described herein again. For example, in step S20, the pressure may be alternating positive air pressure and negative air pressure, or may be only positive air pressure or only negative air pressure, which may be determined according to actual requirements, and the embodiments of the present disclosure are not limited in this aspect. For example, the changing frequency of alternating positive air pressure and negative air pressure can be adjusted, so that a high frequency of changing air pressure and a low frequency of changing air pressure can be provided. The changing air pressure with the high frequency enables the liquid in the extraction region 121 to vibrate, so as to better perform operations such as extraction, rinsing, elution, etc. The changing air pressure with the low frequency can pump the liquid, so that the liquid can flow between the liquid cells 14, the extraction region 121, and the reaction region 123.

It should be noted that, in the embodiments of the present disclosure, the method may further include more steps, which may be determined according to actual requirements, and the embodiments of the present disclosure are not limited in this aspect. The detailed description and technical effects of the method may be referred to the above description of the detection chip 100 and the detection device 200, and details are not described herein again.

The following statements should be noted.

(1) The accompanying drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A detection chip, comprising: a chip substrate and a first sealing film that are stacked, wherein the chip substrate comprises a first surface, and the first sealing film covers the first surface of the chip substrate;

the chip substrate further comprises a fluid channel on the first surface, and the fluid channel comprises a plurality of membrane valve portions; and the membrane valve portions are configured to allow a portion of the first sealing film covering the membrane valve portions to approach and separate, so as to close and open the fluid channel correspondingly, wherein the detection chip further comprises a membrane valve sealing plate, wherein the membrane valve sealing plate is on a side of the first sealing film away from the chip substrate and comprises a plurality of protruding structures, the plurality of protruding structures and the plurality of membrane valve portions are in one-to-one correspondence, and in a case where the plurality of protruding structures are in contact with the plurality of membrane valve portions, respectively, the fluid channel is closed, wherein the chip substrate further comprises at least one liquid cell, the at least one liquid cell is communicated with the fluid channel, at least one of the plurality of membrane valve portions is configured to close and open a portion of the fluid channel communicated with the at least one liquid cell, wherein the fluid channel further comprises an extraction region and a plurality of first branches, and the at least one liquid cell comprises a plurality of liquid cells;

the plurality of first branches are communicated with the plurality of liquid cells in one-to-one correspondence, and each of the plurality of first branches is communicated with the extraction region;

the plurality of membrane valve portions comprise a plurality of first membrane valve portions respectively on the plurality of first branches, so as to control the plurality of first branches to be opened or closed;

the plurality of liquid cells are distributed in a circular shape around the extraction region, wherein the fluid channel further comprises a reaction region and a plurality of second branches;

the reaction region is communicated with the extraction region and at least one of the plurality of liquid cells through the plurality of second branches, respectively;

the plurality of membrane valve portions further comprise a plurality of second membrane valve portions respectively on the plurality of second branches, so as to control the plurality of second branches to be opened or closed, wherein the reaction region comprises a porous structure, the porous structure comprises a plurality of liquid containing holes, and the plurality of liquid containing holes are configured to contain identical or different amplification primers, a position of one of the plurality of liquid containing holes serves as a center position, and remaining liquid containing holes among the plurality of liquid containing holes are distributed in a circular shape around the center position;

the detection chip further comprises a second sealing film, wherein the chip substrate comprises a second surface opposite to the first surface, and the second sealing film covers the second surface of the chip substrate, wherein the second sealing film is a composite film comprising metal foil and a polymer material that are stacked.

2. The detection chip according to claim 1, wherein the first sealing film is an elastic film.

3. The detection chip according to claim 1, wherein the plurality of liquid cells comprise a first liquid cell, a second liquid cell, a third liquid cell, a fourth liquid cell, and a fifth liquid cell, the first liquid cell is configured to contain a lysis solution, the second liquid cell is configured to contain a first rinsing solution, the third liquid cell is configured to contain a second rinsing solution, the fourth liquid cell is configured to contain an eluent, and the fifth liquid cell is configured to accommodate a waste liquid generated in the extraction region during a reaction process.

4. The detection chip according to claim 1, further comprising an adhesive layer, wherein the adhesive layer is between the chip substrate and the first sealing film, and is configured to allow the chip substrate to be adhered with the first sealing film, and the adhesive layer exposes the fluid channel of the chip substrate.

5. A detection device, adapted to operate a detection chip, wherein the detection chip comprises: a chip substrate and a first sealing film that are stacked, the chip substrate comprises a first surface, and the first sealing film covers the first surface of the chip substrate;

the chip substrate further comprises a fluid channel on the first surface, and the fluid channel comprises a plurality of membrane valve portions; and the membrane valve portions are configured to allow a portion of the first sealing film covering the membrane valve portions to approach and separate, so as to close and open the fluid channel correspondingly;

the detection device comprises a membrane valve control unit, the membrane valve control unit is configured to mount the detection chip and comprises at least one protruding portion, and the at least one protruding portion is movable to control the portion of the first sealing film covering the membrane valve portions whether to approach the membrane valve portions or whether to separate from the membrane valve portions in a case where the detection chip is mounted on the membrane valve control unit, so as to close and open the fluid channel correspondingly, wherein the detection chip further comprises a membrane valve sealing plate, wherein the membrane valve sealing plate is on a side of the first sealing film away from the chip substrate and comprises a plurality of protruding structures, the plurality of protruding structures and the plurality of membrane valve portions are in one-to-one correspondence, and in a case where the plurality of protruding structures are in contact with the plurality of membrane valve portions, respectively, the fluid channel is closed, wherein the chip substrate further comprises at least one liquid cell, the at least one liquid cell is communicated with the fluid channel, at least one of the plurality of membrane valve portions is configured to close and open a portion of the fluid channel communicated with the at least one liquid cell, wherein the fluid channel further comprises an extraction region and a plurality of first branches, and the at least one liquid cell comprises a plurality of liquid cells;

the plurality of first branches are communicated with the plurality of liquid cells in one-to-one correspondence, and each of the plurality of first branches is communicated with the extraction region;

the plurality of membrane valve portions comprise a plurality of first membrane valve portions respectively on the plurality of first branches, so as to control the plurality of first branches to be opened or closed;

the plurality of liquid cells are distributed in a circular shape around the extraction region, wherein the fluid channel further comprises a reaction region and a plurality of second branches;

the reaction region is communicated with the extraction region and at least one of the plurality of liquid cells through the plurality of second branches, respectively;

the plurality of membrane valve portions further comprise a plurality of second membrane valve portions respectively on the plurality of second branches, so as to control the plurality of second branches to be opened or closed, wherein the reaction region comprises a porous structure, the porous structure comprises a plurality of liquid containing holes, and the plurality of liquid containing holes are configured to contain identical or different amplification primers, a position of one of the plurality of liquid containing holes serves as a center position, and remaining liquid containing holes among the plurality of liquid containing holes are distributed in a circular shape around the center position;

the detection chip further comprises a second sealing film, wherein the chip substrate comprises a second surface opposite to the first surface, and the second sealing film covers the second surface of the chip substrate, wherein the second sealing film is a composite film comprising metal foil and a polymer material that are stacked.

6. The detection device according to claim 5, further comprising a film driving unit, wherein the film driving unit is configured to, in the case where the detection chip is mounted on the membrane valve control unit, apply pressure to a portion of the first sealing film covering the extraction region, so as to allow the portion of the first sealing film covering the extraction region to deform.

7. A method for using a detection chip, wherein the detection chip comprises: a chip substrate and a first sealing film that are stacked, the chip substrate comprises a first surface, and the first sealing film covers the first surface of the chip substrate;

the chip substrate further comprises a fluid channel on the first surface, and the fluid channel comprises a plurality of membrane valve portions; and the membrane valve portions are configured to allow a portion of the first sealing film covering the membrane valve portions to approach and separate, so as to close and open the fluid channel correspondingly;

the method comprises:

controlling the plurality of membrane valve portions to allow the portion of the first sealing film covering the plurality of membrane valve portions to be separated from the plurality of membrane valve portions, respectively, so as to open the fluid channel correspondingly, wherein the detection chip further comprises a membrane valve sealing plate, wherein the membrane valve sealing plate is on a side of the first sealing film away from the chip substrate and comprises a plurality of protruding structures, the plurality of protruding structures and the plurality of membrane valve portions are in one-to-one correspondence, and in a case where the plurality of protruding structures are in contact with the plurality of membrane valve portions, respectively, the fluid channel is closed, wherein the chip substrate further comprises at least one liquid cell, the at least one liquid cell is communicated with the fluid channel, at least one of the plurality of membrane valve portions is configured to close and open a portion of the fluid channel communicated with the at least one liquid cell, wherein the fluid channel further comprises an extraction region and a plurality of first branches, and the at least one liquid cell comprises a plurality of liquid cells;

the plurality of first branches are communicated with the plurality of liquid cells in one-to-one correspondence, and each of the plurality of first branches is communicated with the extraction region;

the plurality of membrane valve portions comprise a plurality of first membrane valve portions respectively on the plurality of first branches, so as to control the plurality of first branches to be opened or closed;

the plurality of liquid cells are distributed in a circular shape around the extraction region, wherein the fluid channel further comprises a reaction region and a plurality of second branches;

the reaction region is communicated with the extraction region and at least one of the plurality of liquid cells through the plurality of second branches, respectively;

the plurality of membrane valve portions further comprise a plurality of second membrane valve portions respectively on the plurality of second branches, so as to control the plurality of second branches to be opened or closed, wherein the reaction region comprises a porous structure, the porous structure comprises a plurality of liquid containing holes, and the plurality of liquid containing holes are configured to contain identical or different amplification primers, a position of one of the plurality of liquid containing holes serves as a center position, and remaining liquid containing holes among the plurality of liquid containing holes are distributed in a circular shape around the center position;

the detection chip further comprises a second sealing film, wherein the chip substrate comprises a second surface opposite to the first surface, and the second sealing film covers the second surface of the chip substrate, wherein the second sealing film is a composite film comprising metal foil and a polymer material that are stacked.

8. The method according to claim 7, wherein controlling the plurality of membrane valve portions to allow the portion of the first sealing film covering the plurality of membrane valve portions to be separated from the plurality of membrane valve portions, respectively, so as to open the fluid channel correspondingly, comprises:

controlling the plurality of first membrane valve portions to allow the plurality of liquid cells to be communicated with the extraction region, so as to allow liquid in the plurality of liquid cells to enter the extraction region; and controlling the plurality of second membrane valve portions to allow the reaction region to be communicated with the extraction region, so as to allow liquid in the extraction region to enter the reaction region.

9. The method according to claim 8, further comprising: controlling flow of liquid in the detection chip by applying pressure to a portion of the first sealing film covering the extraction region.

* * * * *